United States Patent [19]

Hube et al.

[11] Patent Number: 5,229,814
[45] Date of Patent: Jul. 20, 1993

[54] SYSTEM FOR IDENTIFYING A SUBSTITUTE PAPER STOCK FOR UNAVAILABLE PAPER STOCK WHEN PRINTING A JOB

[75] Inventors: Randall R. Hube, Rochester; Timothy J. Kelley, Farmington, both of N.Y.

[73] Assignee: Xerox Corporation, Stamford, Conn.

[21] Appl. No.: 922,725

[22] Filed: Jul. 31, 1992

[51] Int. Cl.⁵ .......................................... G03G 15/00
[52] U.S. Cl. ................... 355/203; 355/311; 355/77; 364/222.8; 364/226.3; 364/DIG. 1
[58] Field of Search ............... 355/203, 204, 209, 311, 355/77; 364/221, 221.7, 222, 222.6, 222.8, 226.3, 917.7, 918.4

[56] References Cited

U.S. PATENT DOCUMENTS

| | | |
|---|---|---|
| 4,579,444 | 4/1986 | Pinckney . |
| 4,603,962 | 8/1986 | Dekura . |
| 5,129,639 | 7/1992 | DeHority ........................ 355/311 X |

FOREIGN PATENT DOCUMENTS 62-209472A 9/1987 Japan .

OTHER PUBLICATIONS

J. L. Bacon, "Copy Sheet Size Selection", *IBM Technical Disclosure Bulletin*, vol. 17 (No. 9) pp. 2690-2690A, Published: Feb. 1975.

*Primary Examiner*—R. L. Moses

[57] ABSTRACT

A process is provided for operating an electronic printing system at a job site for producing print jobs from image signals, the electronic printing system having programming means for inputting printing instructions for the print jobs and a plurality of supply trays for supplying print media, including the steps of: identifying stock characteristics currently available for loading in the print media supply trays when printing the print jobs; identifying stock characteristics potentially selectable but not available at the site for loading in the print media supply trays; mapping individual ones of the unavailable stock characteristics with at least one of the available stock characteristics; on input of a print job, comparing a requested stock characteristic of the print job with the stock characteristics available; and where the requested stock characteristic is unavailable, using the mapping step to substitute a corresponding available stock characteristic for the unavailable, requested stock characteristic.

13 Claims, 14 Drawing Sheets

FIG. 4

SYSTEM FOR IDENTIFYING A SUBSTITUTE PAPER STOCK FOR UNAVAILABLE PAPER STOCK WHEN PRINTING A JOB

The invention relates to electronic printing systems, and more particularly to a process for an identifying available stock type for use in place of the stock type programmed for a print job when the programmed stock type is unavailable.

In many light/lens copiers, the paper stock to be used for a job is determined by the operator at run time. Typically, the operator does this by loading the stock desired into one of the copier paper trays and then specifying the use of that tray for the job. In this type of operation, the copier is largely unaware of the paper stock being used. However, in some more advanced copiers, certain stock characteristics such as drilled, color, etc. of the stock loaded in the paper trays can be programmed into the copier as a reminder to the operator of the type of paper stock that is in each tray. This information does not, however, affect what stock the job uses if the operator allows the wrong stock to be used.

Other copier types allow the user to specify the size of the paper stock to be used for a job at the console. From this, the copier determines which paper tray contains the specified size. Many laser printers also work in a similar fashion in that the submitter of the electronic job can specify the size of the paper stock to use and the printer then determines which tray contains that paper size and uses it.

Generally, the above schemes work well when the operator can maintain close association between the job's stock requirements and the currently loaded paper stock. This is largely the case in systems that do not queue up jobs with greatly varying stock requirements.

However, the Xerox Docutech Production Publisher ("Xerox" and "DocuTech" are registered Trademarks of Xerox Corporation, Stamford, CT) is able to employ a different system. There, as described more fully in U.S. patent application Ser. No. 07/590,101 to Josefina Moreno et al., and entitled "Paper Supply Tray Status In Electronic Printers" filed on Sep. 28, 1990, the pertinent portions of which are incorporated herein, the user specifies both the stock characteristics (i.e., size, color, type) required for the print job and the characteristics of the paper stock loaded in the paper trays. The system then determines which paper tray, if any, contains the paper stock that matches the job's requirements. If a match is found, the paper stock is used and the job proceeds. If a match is not found, the job is faulted and the operator is instructed to load the proper stock.

While this latter type of printing system has greatly and advantageously expanded the number of paper stock characteristics that may be specified for a print job, it has also brought attention to the situation where the printing system sites are unable to stock all of the many types of paper stock that may be programmed by customers. This inability to stock all the various types of paper stock may be due to lack of room at the site, cost, etc.

Although a print job may, in the event that the paper stock programmed for the job is not available at the site, be turned away, this is not desirable nor normally a good business practice. On the other hand, the site operator might try to re-program the job with a different stock but this could be a a time consuming and uneconomical process, particularly where the number of print jobs programmed for unavailable paper stock types is large.

The following references may be pertinent to the present application:

U.S. Pat. No. 4,603,962, Patentee: Dekura, Issued: Aug. 5, 1986.

U.S. Pat. No. 5,167,013, Patentees: Hube et al., Issued Nov. 24, 1992.

Japanese Publication No. 62-209472(A), Publication Date: Sep. 14, 1987, Japanese Patent Application No. 61-53409, Filing Date: Mar. 10, 1986, Inventor: Ito.

Inventor: Bacon, Copy Sheet Size Selection, IBM Technical Disclosure Bulletin, Vol. 17 (No. 9) at 2690-2690A, Published: February, 1975.

U.S. Pat. No. 4,603,962 discloses a copying apparatus with a display panel for displaying copier operating conditions, and selection switches for selecting different size copying paper stored in the copier paper cassettes. In the event that there is a mismatch between the size of the paper programmed for a job and the cassette selected for the job, a message with instructions for selecting the right cassette is displayed on the display panel.

U.S. Pat. No. 5,167,013 discloses an arrangement for use in a printing system in which an operator can specify acceptable font substitutes of available fonts for unavailable fonts. Upon detection of a document specification of an unavailable font, a print controller searches a mapping of known fonts to available fonts to determine if an equivalent font has been designated. The mapping is operator-set in accordance with the operator perception of equivalence.

Japanese Publication No. 62-209472 (A) discloses a copying machine having an automatic paper select function which, in the event that there is no paper at the selected paper feed slot, searches for a paper feed slot having the best size paper for the job thereby enabling the copying process to nevertheless start.

IBM Technical Disclosure Bulletin, Vol. 17, No. 9 at 2690-2690A discloses a reproduction apparatus including document and copy sheet size detectors designed to select a copy sheet size that most closely approximates the size of the original document.

In contrast to the disclosures of the above references, the present invention provides a process for operating an electronic printing system at a job site for producing print jobs from image signals, the electronic printing system having programming means for inputting printing instructions for the print jobs and a plurality of supply trays for supplying print media, comprising the steps of: identifying stock characteristics currently available for loading in the print media supply trays when printing the print jobs; identifying stock characteristics potentially selectable but not available at the site for loading in the print media supply trays; mapping individual ones of the unavailable stock characteristics with at least one of the available stock characteristics; on input of a print job, comparing a requested stock characteristic of the print job with the stock characteristics available; and where the requested stock characteristic is unavailable, using the mapping step to substitute a corresponding available stock characteristic for the unavailable, requested stock characteristic.

These and other aspects of the invention will become apparent from the following description, the description being used to illustrate a preferred embodiment of the invention when read in conjunction with the accompanying drawings.

Figure 1:
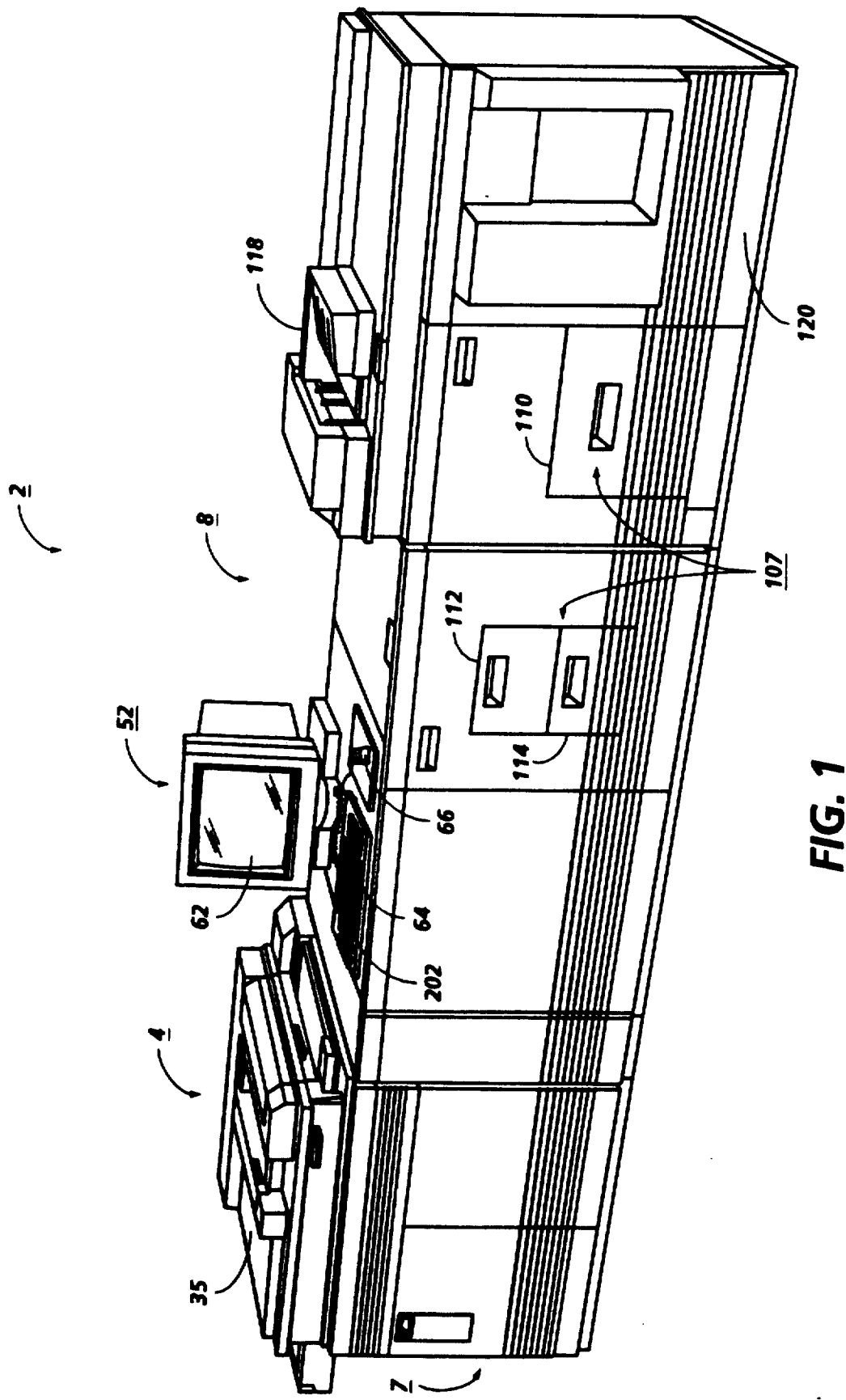
FIG. 1 is a view depicting an electronic printing system of the type adapted to employ the stock substitution system of the present invention.
Figure 3A:
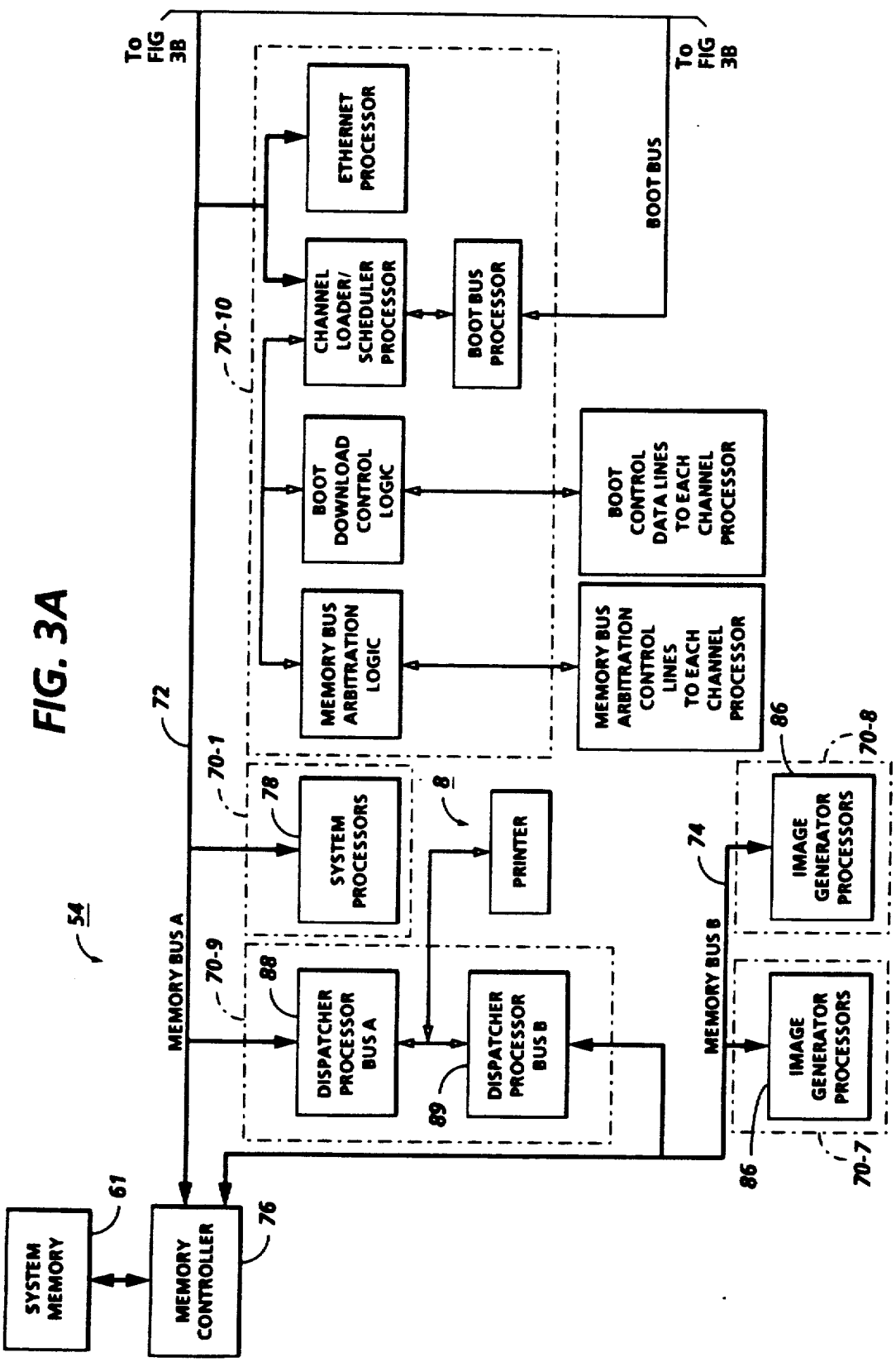
Figure 3B:
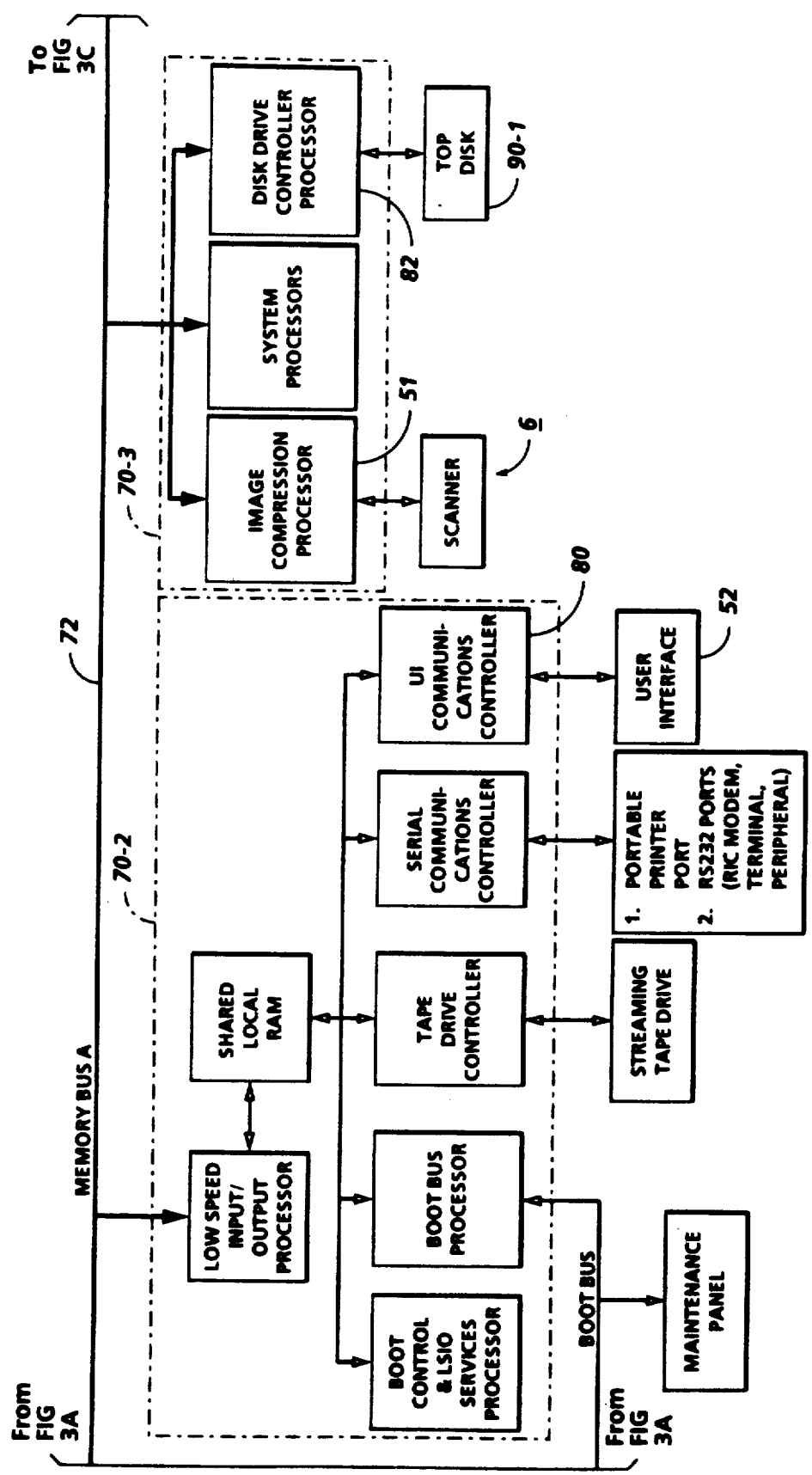
Figure 3C:
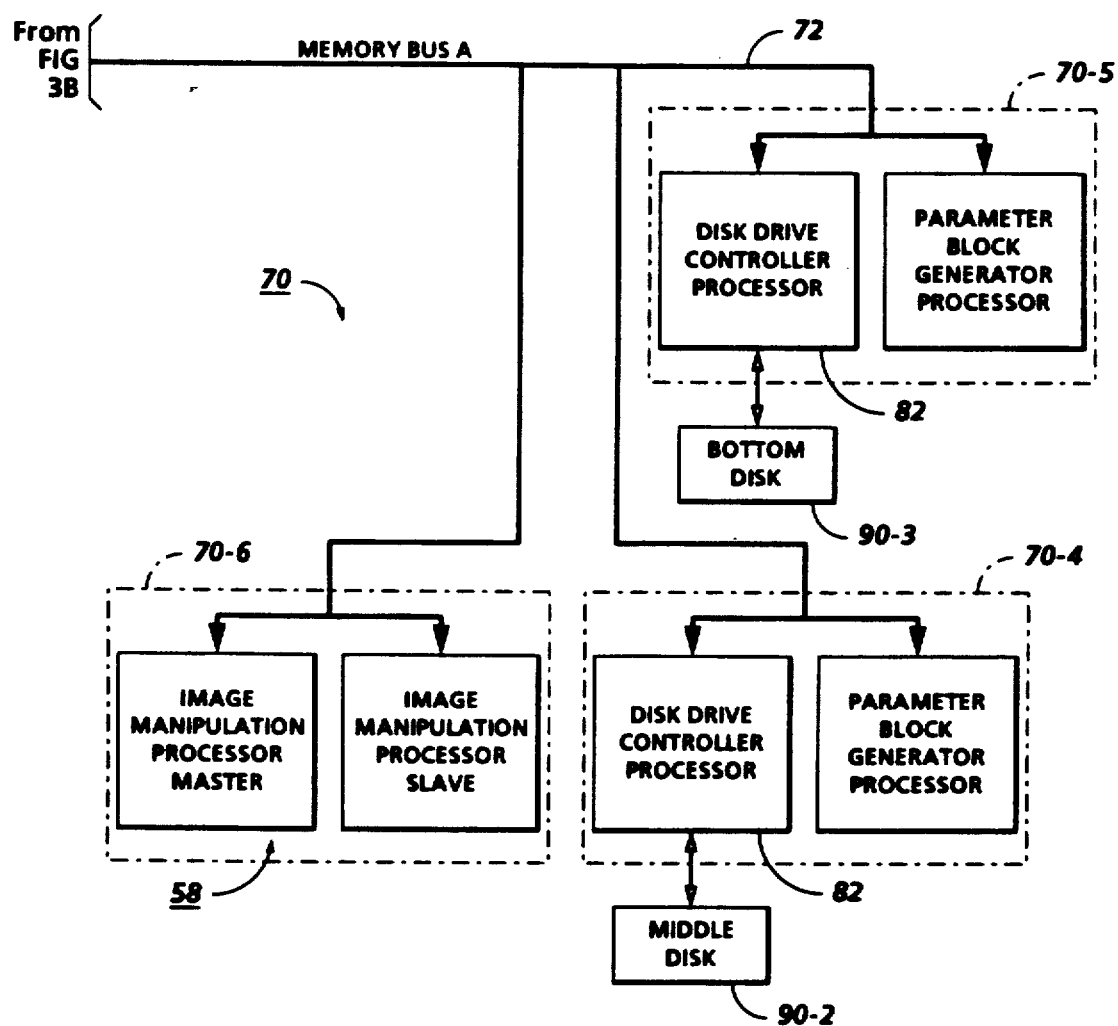
Figure 5:
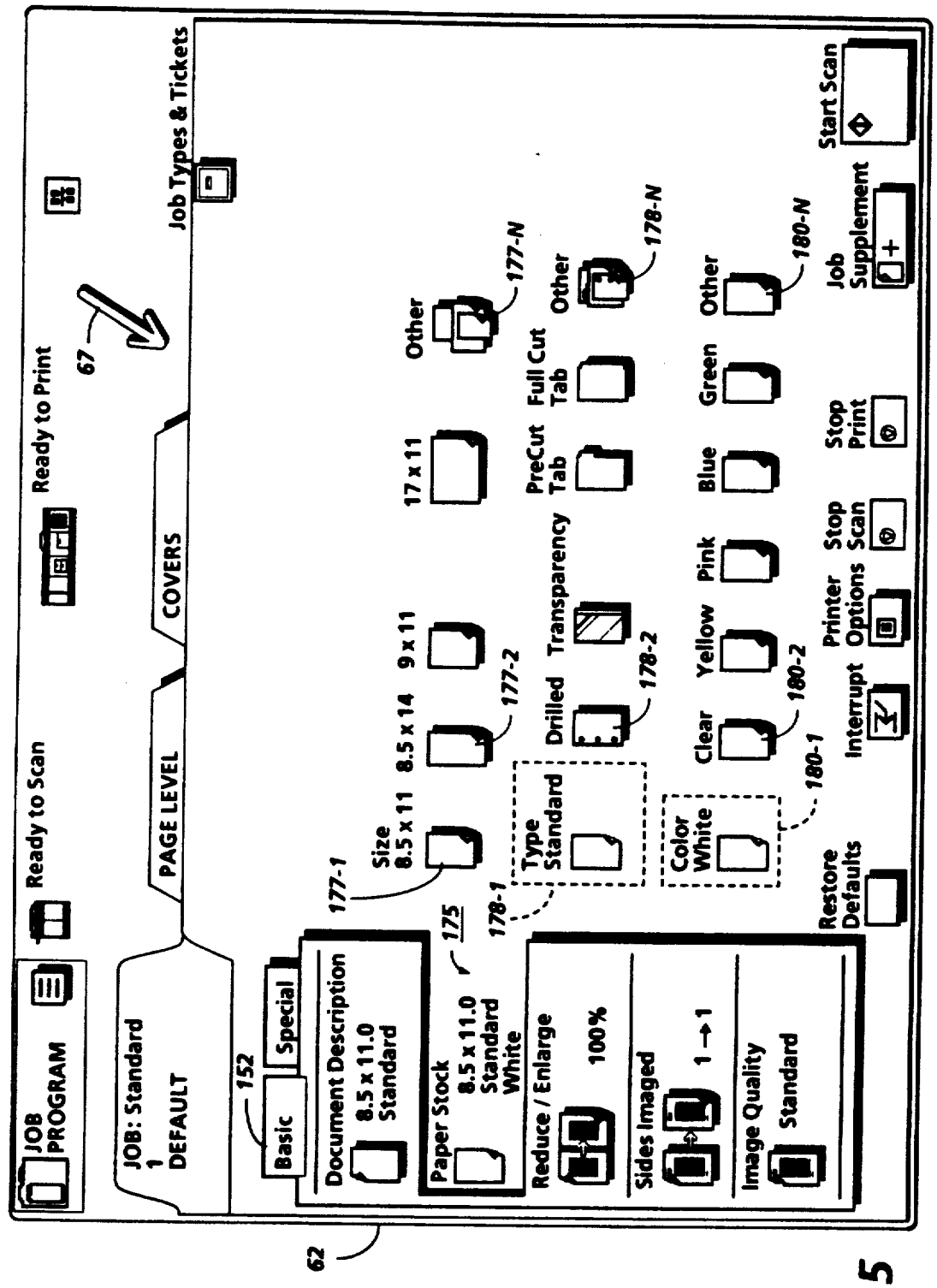
Figure 6A:
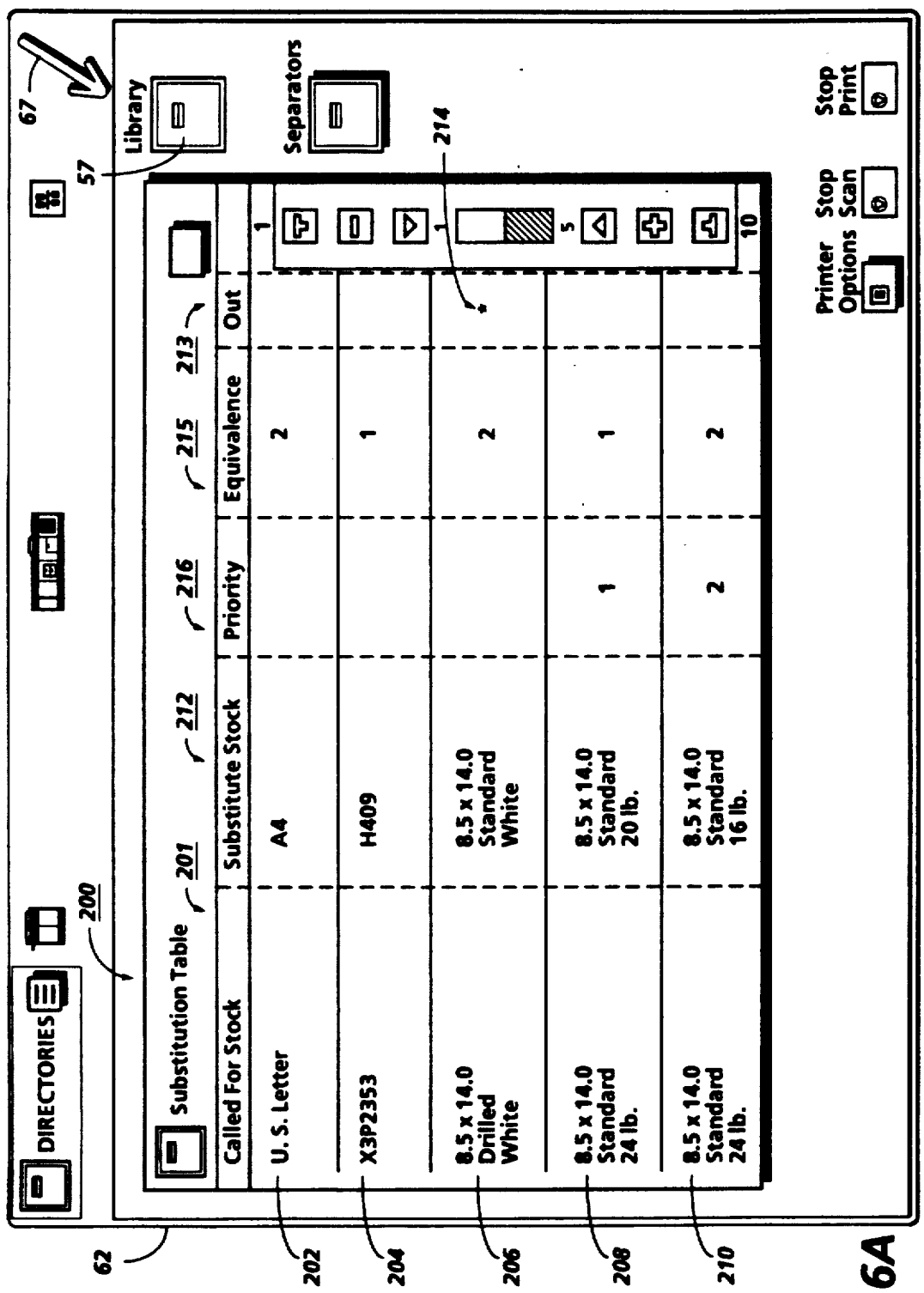
Figure 6B:
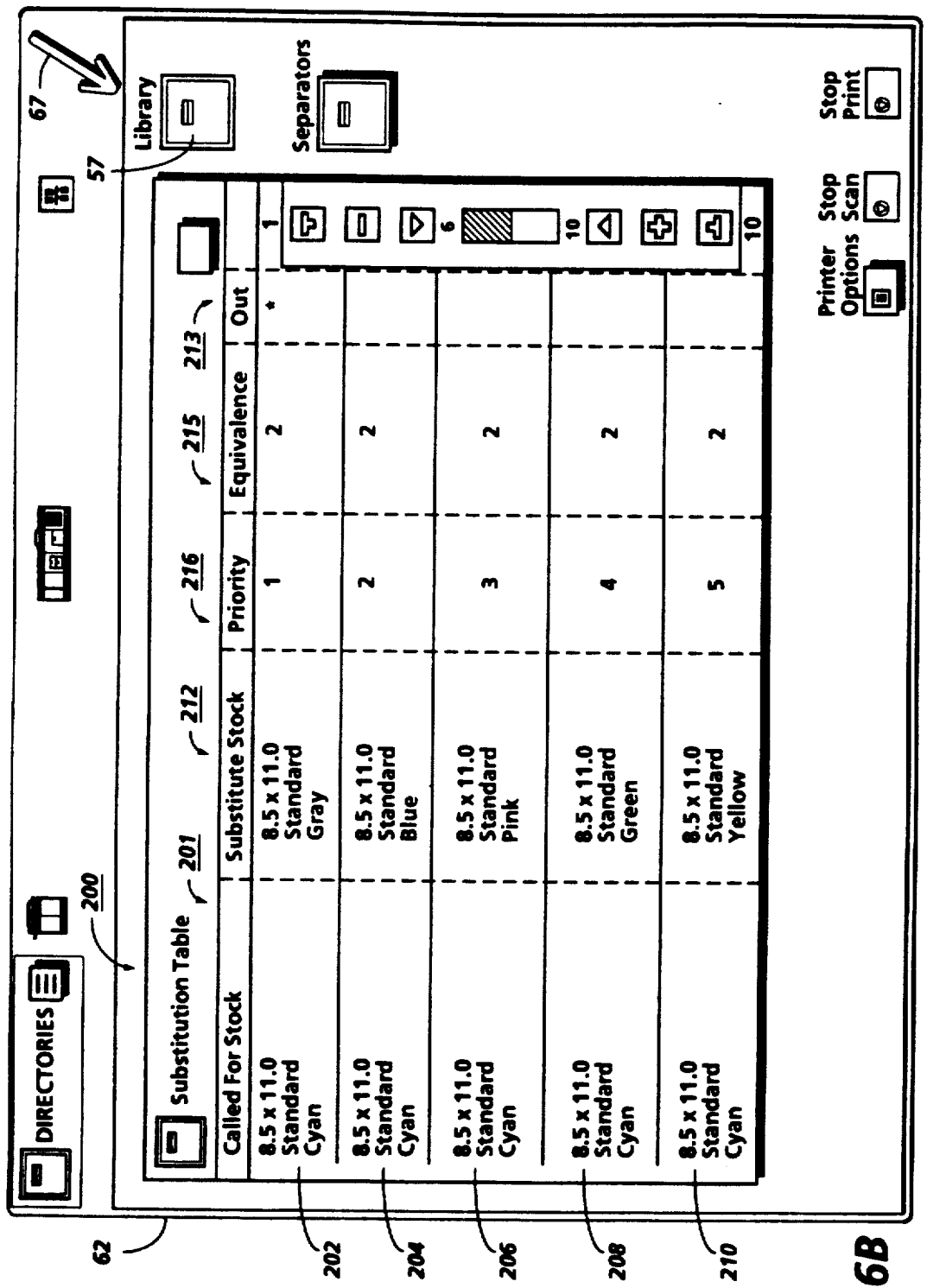

FIGS. 3A, 3B, and 3C comprise a schematic block diagram showing the major parts of the control section for the printing system shown in FIG. 1;

Figure 4:
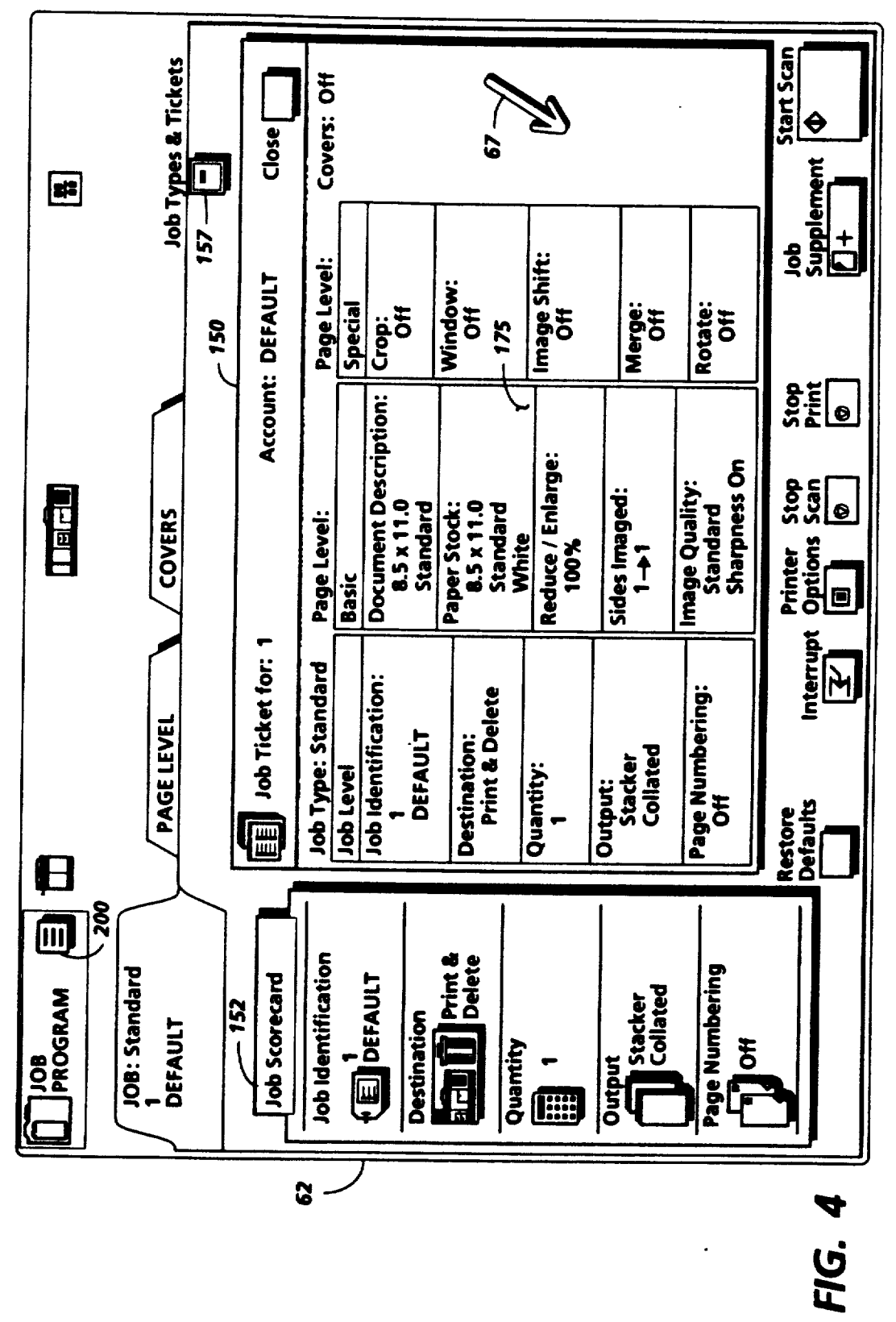

FIG. 4 is a view depicting an exemplary job programming ticket and job scorecard displayed on the User Interface (UI) touchscreen of the printing system shown in FIG. 1, the job ticket and job scorecard being associated with a job to be printed;

FIG. 5 is a view of the UI touchscreen shown in FIG. 4 depicting the job program selections displayed to program paper stock for all, or certain pages, of the job to be printed;

FIGS. 6A and 6B comprise a view of the UI touchscreen shown in FIG. 4 illustrating examples of the Stock Substitution Table used to identify an available substitute stock for an unavailable stock in accordance with the present invention; and FIGS. 7A-7E comprise a flow chart illustrating the process of identifying from a listing of available paper stock a substitute paper stock for use in place of the unavailable paper stock originally programmed for a print job.

Figure 2:
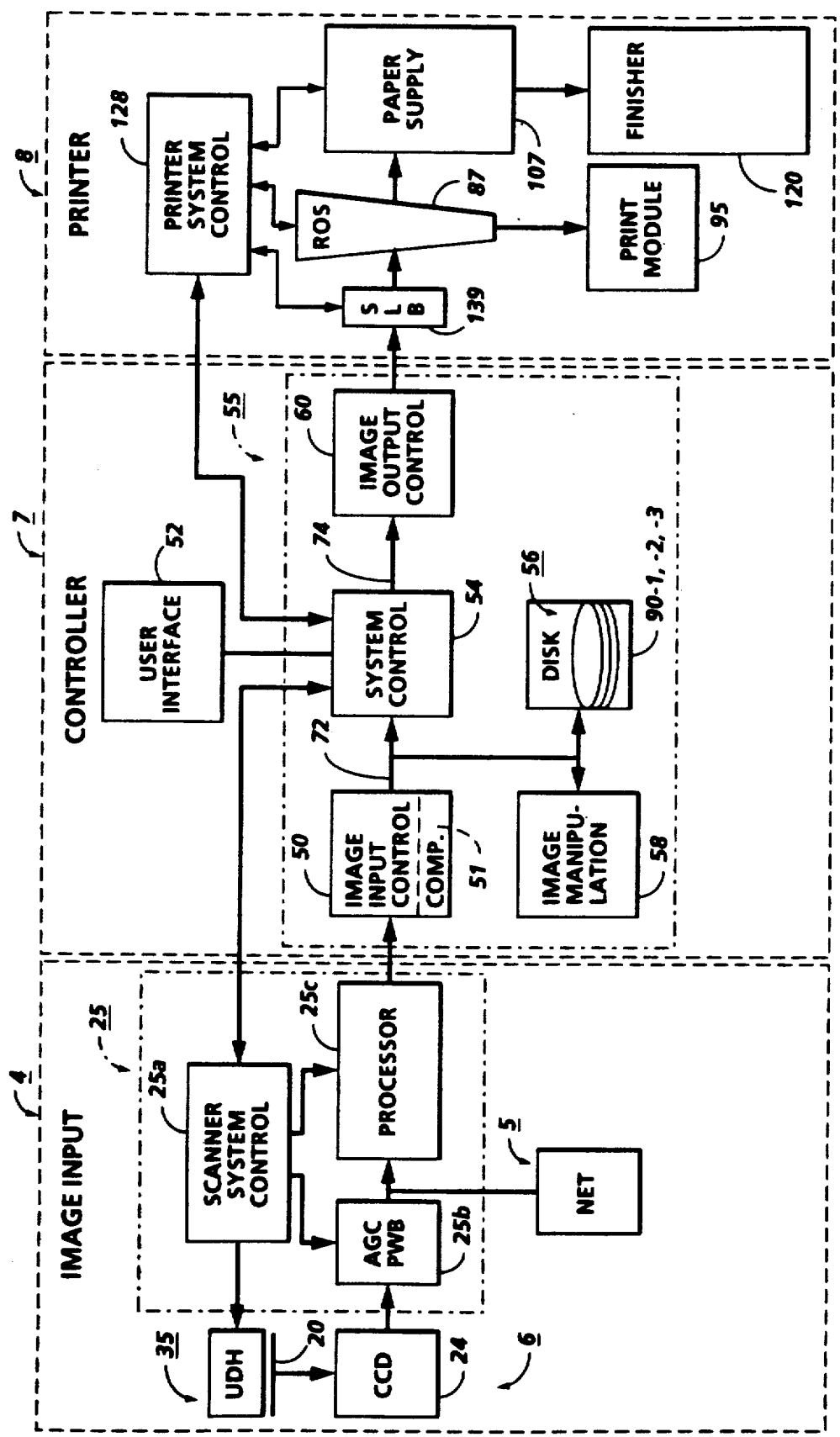
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image-scanning/processing/recording systems, or else other signal transmitting/receiving, recording systems, etc. as well.

For off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3A) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 4) to the item selected and keying the mouse.

Main memory 56 (FIG. 2) has plural hard disks 90-1, 90-2, 90-3 for storing machine Operating System software, machine operating data, and the scanned image data currently being processed When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3A-3C, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3A-3C), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 4, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at the level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Referring to FIGS. 4 and 5 also, one of the selections to be made when programming a job is to choose the stock characteristic (Paper Stock) on which prints will be made. During the job programming mode, the PAPER STOCK icon 175 displayed on a job Scorecard 152 on touchscreen 62 is actuated (as by touching screen 62 or pointing cursor 67 at icon 175 and actuating mouse 66) when a paper stock selection different from the default stock selection is desired. Actuating icon 175 displays three levels of media selections (FIG. 5), namely size, type, and color on touchscreen 62 adjacent Scorecard 152. As will appear from the discussion of FIGS. 6A and 6B, the technique of the present invention contemplates the use of other media selections or media characteristics, such as stock weight. At the size selection level, a series of icons 177-1, 177-2, . . . 177-n are displayed, each depicting the various sheet size selections available. The selections include an "other" icon 177-n for custom selections. At the media type selection level, a series of icons 178-1, 178-2, . . . 178-n are displayed, depicting the various types of media that are available for selection including an "other" icon 178-n for custom selections. At the color selection level, a series of icons 180-1, 180-2, . . . 180-n are displayed, depicting the various media color selections including an "other" icon 180-n for custom selections. The job program including the stock characteristic chosen for the job is entered into main memory 56 where it is held pending use. While only size, type, and color levels of media selections are disclosed herein, use of other stock characteristics is contemplated by the present invention.

In the exemplary job #1, the job ticket 150 therefor shown in FIG. 4 has the Paper Stock for the job programmed of 8.5"×11" (size), standard (type), and white (color) media.

As can be seen, printing system 2 allows customers when programming a print job a wide, almost endless choice of stock characteristics. To accommodate this, a job site would need to store and have at hand all of the various stock characteristics potentially selectable by customers. However, this may not be practical or economically feasible, particularly in the case of stock characteristics that are only infrequently used. Nevertheless, rather than turning jobs away, it would be desirable to enable a site to run print jobs that call for a stock characteristic that the site does not have or is temporarily out of with a substitute stock characteristic which is in supply at the job site and meets most of the requirements for the job.

Referring to FIGS. 6A, 6B, to accomplish this aim and in accordance with the teachings of the present invention, stock supply information identifying the stock characteristics currently on hand at the site for printing jobs is entered and stored in system memory 56. The data is entered by the site administrator or operator at any convenient time using UI 52. For example, the data may be initially entered at the start of operation each day and periodically updated during the day as the availability of the different stock characteristics changes with system operation. The stock supply information, which is stored in library 57 of memory 56, provides inputs to a Stock Substitution Table 200 of equivalent stock mappings. The inputs preferably include CALLED FOR STOCK (column 201), SUBSTITUTE STOCK (column 212), OUT (column 213), EQUIVALENCE (column 215) and PRIORITY (column 216).

Table 200, which may be displayed on screen 62 of UI 52 whenever desired, identifies stock characteristics that may be substituted when another stock is unavailable at the site. Effectively, Table 200 maps "called for" or "requested stock" characteristics with stock characteristics currently available at the site. For this, a list of stock characteristics that are potentially programmable by a customer, but which are normally not stocked at the site (CALLED FOR STOCK) is provided in column 201. Examples of called for stock characteristics are shown at rows 202, 204, 206, 208, 210. For each called for stock characteristic in column 201, one or more substitution stock characteristics (SUBSTITUTE STOCK) are designated in the adjoining column 212.

Preferably, column 201 also includes stock characteristics that are normally stocked at the site to allow for substitution in cases where the supply of a particular stock is temporarily exhausted. Where a normally available stock characteristic listed in column 212 is currently called for, the unavailability of such stock characteristic is identified by an asterisk 214 in "OUT" (column 213 of Table 200). As shown, in row 206, 8.5"×14", Drilled, White, which is normally stocked at the site but is currently unavailable, has an asterisk 214 in column 213 (OUT) to indicate such unavailability. Other ways of identifying 'out of supply' stocks such as by highlighting, bolding, color, use of additional tables/lists, etc. are contemplated by the present invention.

In accordance with one aspect of the invention, stock substitutions may be assigned an indicia referred to as "EQUIVALENCE." This indicia serves to designate perceptual similarity of physical stock characteristics as perceived by an operator or site administrator. By setting equivalency, the operator can make a judgement regarding the perceptual sameness based on physical stock characteristics. In the preferred embodiment, called for stock characteristics may be mapped to more than one available equivalent stock characteristic. For example, 8.5"×14", Standard, 24 lb stock has two potential substitutes, 8.5"×14", Standard, 20 lb and 8.5"×14", Standard, 16 lb as shown in rows 208, 210.

Normally, the level of equivalence of one stock characteristic relative to another is based on the perception that the person creating Table 200 has regarding the acceptability of a given substitute stock characteristic. Usually, this is done in advance by the site administrator or operator. Table 200 provides, in column 215, the EQUIVALENCE indicia in the form of a scale of from "1" to "3" identifying the relative levels of equivalency that the various stock characteristics have with respect to one another. In the example given above for 8.5"×14", Standard, 24 lb, the two substitutes 8.5"×14", Standard, 20 lb and 8.5"×14", Standard, 16 lb have equivalence of "1" and "2" respectively. Table I herein provides an example of possible equivalence definitions and effect.

TABLE 1

| DEGREE | DEFINITION | POSSIBLE SYSTEM ACTION |
|---|---|---|
| 1 | Deemed fully equivalent in all respects | Print job with substitution |
| 2 | Deemed not fully equivalent, but generally acceptable for substitution. | Print job with banner sheet warning of substitution |
| 3 | Deemed marginally acceptable but should not be used in all cases. | Print job after operator confirmation of substitution |

For example, referring specifically to FIG. 6A, a called for stock such as X3P2353 (row 204), is mapped to an available or substituted stock, such as H409. In this case, it has been determined that the called for stock and the substitute stock are nearly the same, and hence substantially the equivalent of one another. Accordingly, a degree of equivalency of "1" is assigned. In contrast, in the case of called for stock 8.5"×11", Standard, Cyan, a stock whose characteristics are 8.5"×11", Standard, Gray (FIG. 6B), is mapped as the substitute stock. However, in this case, the called for stock and substitute stock are deemed to be poor equivalents and the mapping is given a degree of equivalence of "3". Other bases for mapping stock equivalency may be envisioned.

It will be understood that other ways of indicating degrees of stock equivalency are possible. For example, a two level "Yes-No" display in which "yes" is for stock characteristics that are equivalent for the purposes of the user and "no" for stock characteristics that, while similar enough to be substituted occasionally, are not equivalent (and may require that a warning be given to the customer) may be envisioned. Equivalency definitions may be based on any desirable, possibly subjective, factor or combination of factors such as matches or match differences in sheet size, opacity, prefinish, color, weight, etc.

In accordance with a further aspect of the invention, stock substitutions may be given an overall priority ("PRIORITY"). Priority reflects the degree of acceptability in using one stock characteristic over another when their respective EQUIVALENCES are comparable. Factors that may affect PRIORITY are the quantity of the substitute stock currently on hand at the site, price, whether or not a substitute stock is already loaded in one or more of the paper trays 110, 112, 114 (thereby avoiding the need to empty and reload a paper tray), customer desires, etc. For example, where two or more substitutions apply to a single stock characteristic, it may be expedient to prioritize the substitutions based on other factors, such as cost. As shown in FIG. 6B, the best match for a single stock characteristic, such as for 8.5"×11", Standard, Cyan stock characteristic is 8.5"×11", Standard, Gray. However, additional, albeit poorer matches, as, for example, due to higher cost, for that paper stock family are 8.5"×11", Standard, Blue; 8.5"×11", Standard, Pink; 8.5"×11", Standard, Green and 8.5"×11", Standard, Yellow. In such case, the best match would normally be used. This may be done, as shown in column 216 by a numerical priority indicator, for example 1-5, which indicates stock priority through the mapping. In the above example, 8.5"×11", Standard, Gray has a priority of "1", 8.5"×11", Standard, Blue a priority of "2"; 8.5"×11", Standard, Pink a priority of "3"; and 8.5"×11", Standard, Green a priority of "4". Alternatively, the ordering of the mappings may be pre-emptive, so that the first applicable mapping reached is used.

During use, the operator loads the programmed stock into one of the paper trays 110, 112, 114 and enters, by means of UI 52, the characteristics of the stock, i.e., size, type, and color. When the job is run, controller section 7 compares the the stock programmed for the job to the stock programmed for the tray or trays. Where the stocks match, the job is run. If the stock programmed for the paper trays does not match the stock programmed for the job, the job is faulted.

Figure 7A:
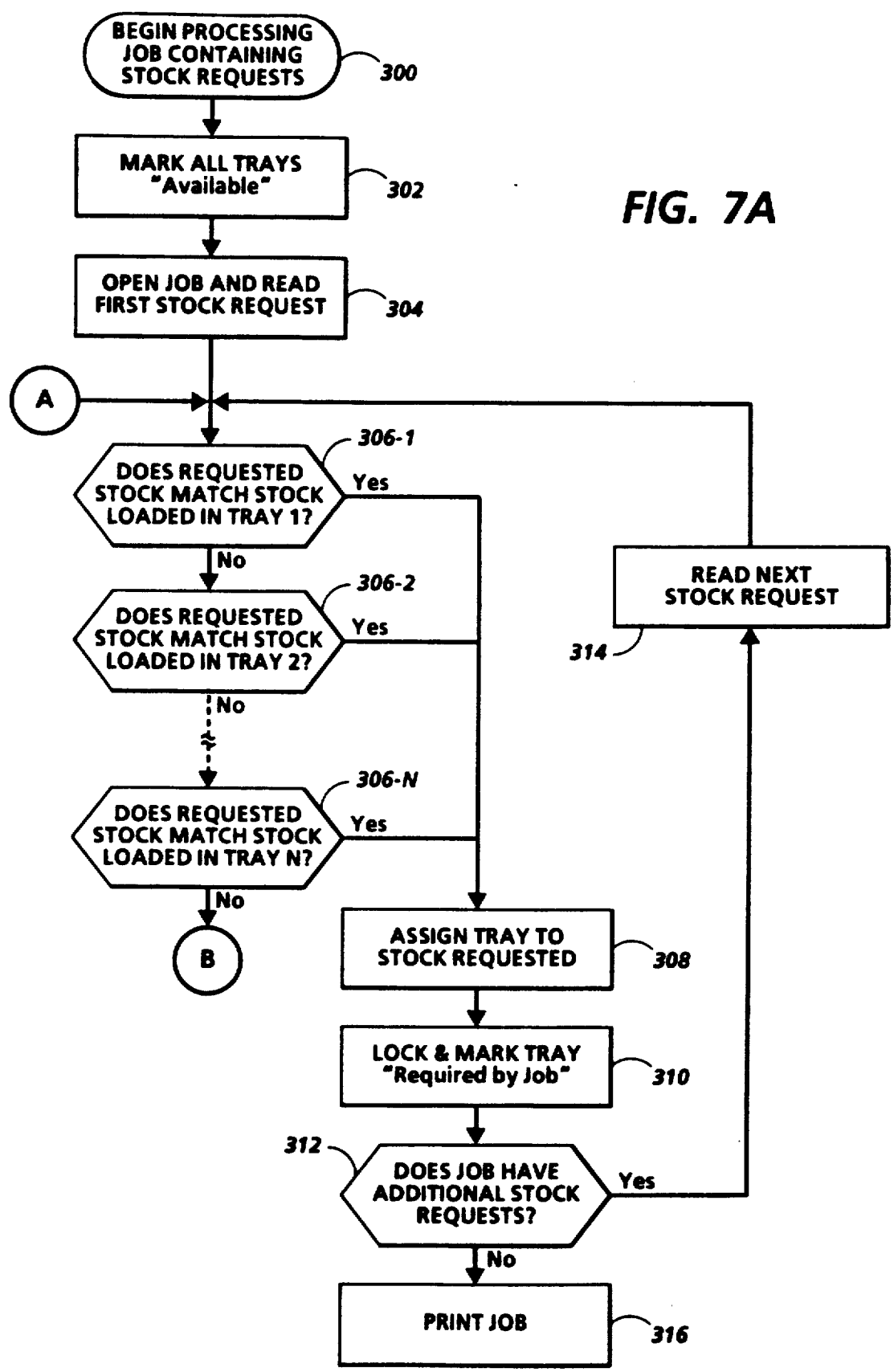

Referring to FIGS. 7A-7E, an exemplary implementation of the substitution scheme of the present invention is shown in flow diagramatic form. Referring specifically to FIG. 7A, an initialization subroutine for the exemplary implementation is shown. A job with one or more stock requests is provided at step 300 and the corresponding paper trays of the printing system 2 are marked "Available" at step 302. Preferably, each stock request includes specifications regarding size, type and color. As each stock request is read in sequence (step 304), a decision is made via steps 306-1 306-2, ... 306-N regarding whether the requested stock matches stock loaded in one of the available trays. Where the stock request matches stock in an available tray, the stock request is assigned to the available tray (step 308), the tray then being locked and designated "Required by Job" (step 310). Where, on the other hand, the requested stock does not match stock loaded in the trays, the process proceeds to a substitution assessment subroutine of FIG. 7B. Per a decision at step 312, either remaining stock requests are processed, by way of the loop including steps 314 and 306-1, 306-2, ... 306-4, or the job is printed at step 316.

Figure 7B:
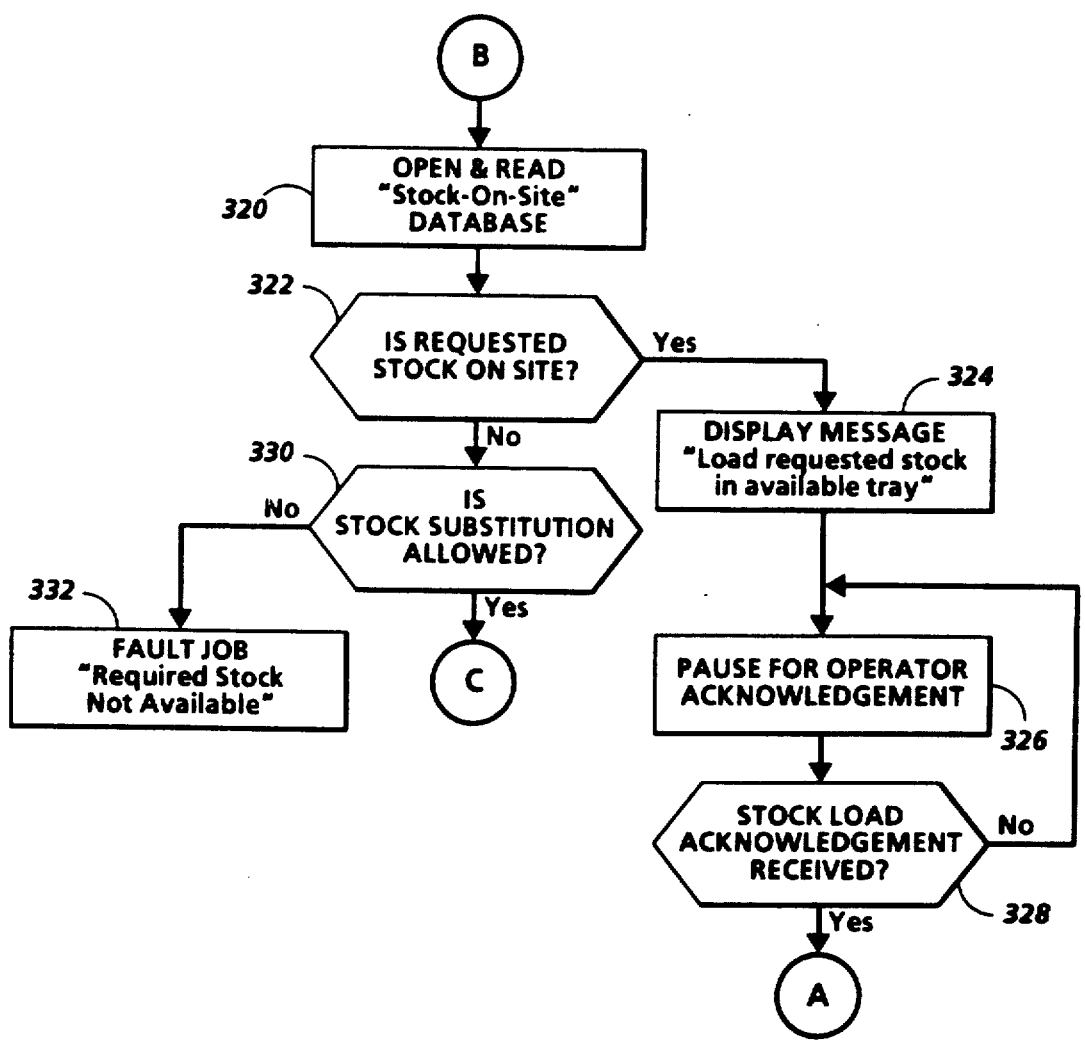

In the substitution assessment subroutine of FIG. 7B, indicating the stock characteristics on site, a "Stock-on-Site" Database is opened and read (step 320). At step 322, it is decided whether the REQUESTED STOCK is on site. If the REQUESTED STOCK is on site, then the operator is directed to load the REQUESTED STOCK (step 324), and, by way of steps 326 and 328, the process is paused until the operator takes an appropriate action. If the REQUESTED STOCK is not on site, a decision is made at step 330 regarding whether stock substitution is allowed. Provided that substitution is not allowed, a fault message is issued at step 332, and if substitution is allowed, then the process proceeds to the searching subroutine of FIG. 7C.

Figure 7C:
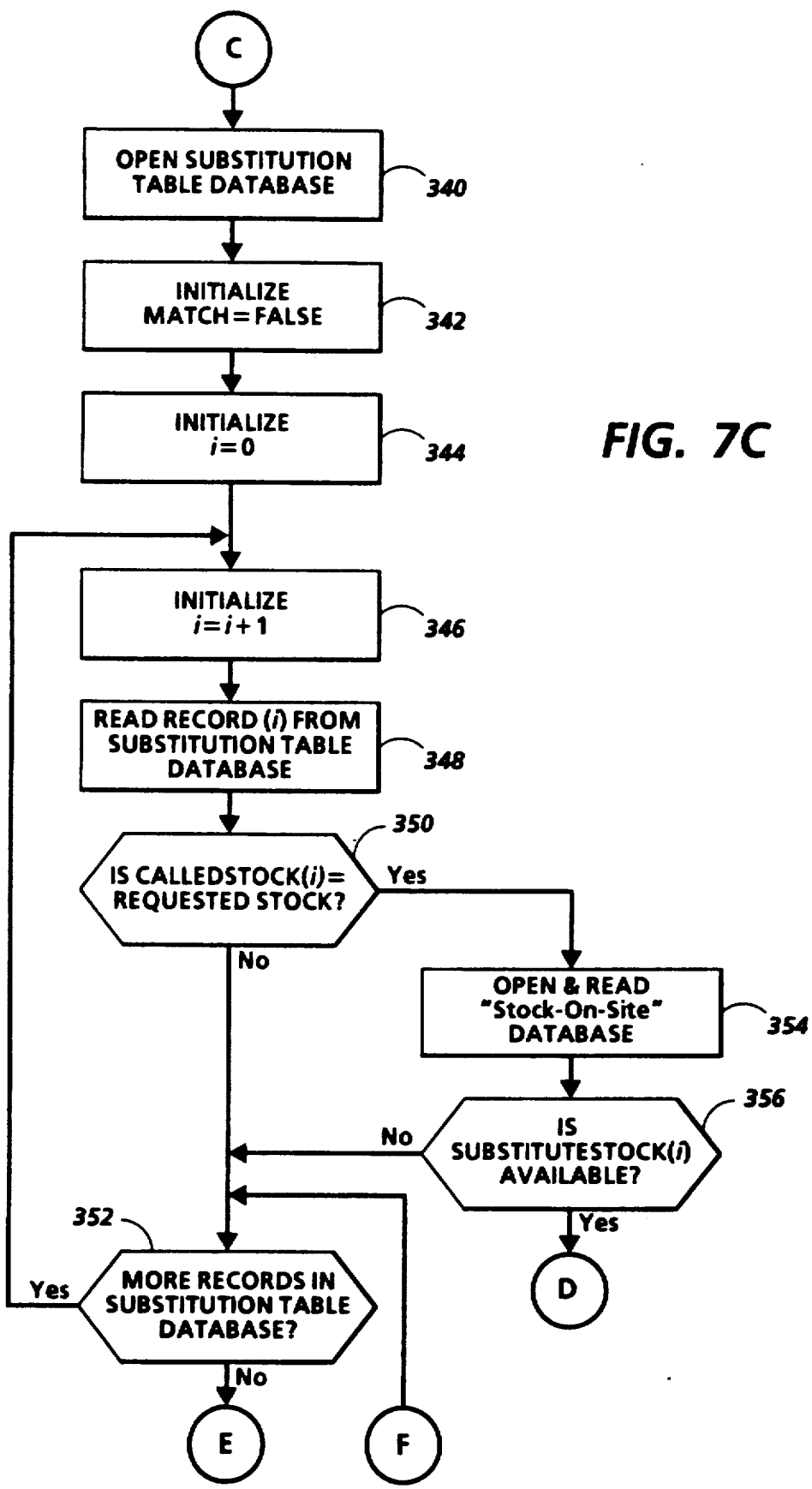

Referring to FIG. 7C, at step 340, a Substitution Table Database, for the stock characteristics shown schematically in FIGS. 6A and 6B, is accessed. A flag indicating a match between a CALLEDSTOCK(i) and a SUBSTITUTESTOCK(i) is then initialized at step 342 and a counting variable is initialized at step 344. It will be recognized that the Substitution Table Database is preferably a look-up table that can be read with a counting technique, which technique is facilitated by the incrementing step 346. At step 348, a RECORD(i) is read from the Substitution Table Database. As will be understood from the discussion regarding FIGS. 6A and 6B, each RECORD(i) contains entries for CALLEDSTOCK(i), SUBSTITUTESTOCK(i), EQUIV(i) and PRIORITY(i). If it is decided at step 350 that the REQUESTED STOCK is not the same as the CALLEDSTOCK(i), and it is decided at step 352 that there are more entries in the Substitution Table Database then the process proceeds by incrementing i at step 346. If, on the other hand, it is decided, at step 350, that the REQUESTED STOCK is the same as the CALLEDSTOCK(i), the Stock-On-Site-Database (FIG. 7B, step 320) is opened (step 354), and, at step 356, it is decided whether the SUBSTITUTESTOCK(i) is available. Where the SUBSTITUTESTOCK(i) is not available, the process proceeds to step 352, and where the SUBSTITUTESTOCK(i) is available the process proceeds to the priority/equivalents determining subroutine of FIG. 7D.

Figure 7D:
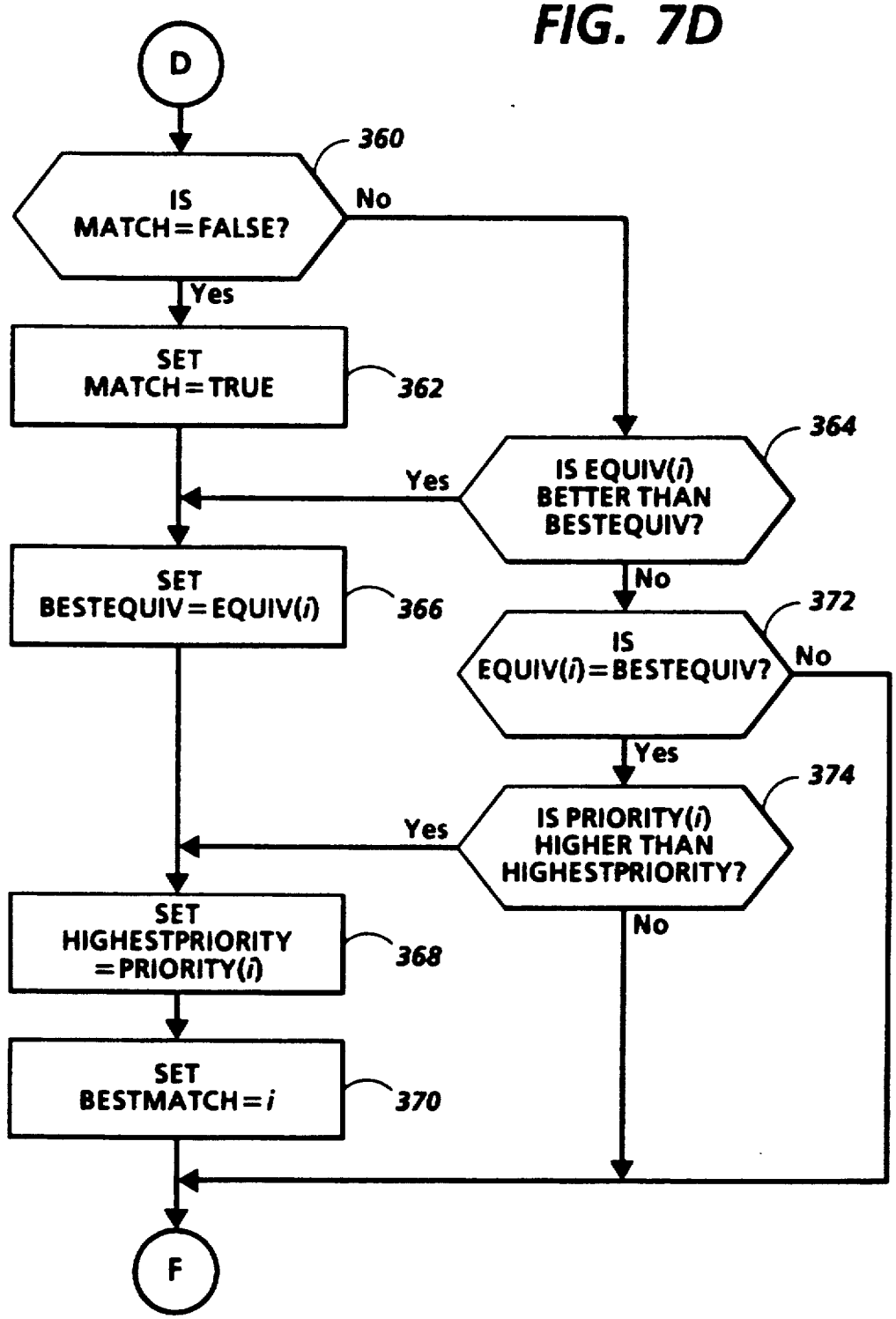

Referring to FIG. 7D, the status of the above-mentioned flag is checked (step 360) and then either the flag is set to true (step 362) or the equivalency of the selected RECORD(i) is assessed at step 364. If the flag is set to true, then the SUBSTITUTE(i) obtained by way of step 356 (FIG. 7C) is the first match found, and is accordingly designated as the BESTMATCH, via steps 366, 368 and 370. If, on the other hand, the flag was already true and the selected EQUIV(i) is better than the present BESTEQUIV, then the selected EQUIV(i) is set to BESTEQUIV (step 366), the corresponding PRIORITY(i) is set to HIGHESTPRIORITY (step 368) and the selected RECORD(i) is designated as a BESTMATCH (step 370). For a negative decision at step 364 and a positive decision at step 372, the selected EQUIV(i) is tested for priority at step 374. In the example of FIG. 7D, priority serves as a tie-breaking mechanism for those situations in which multiple records of the same equivalency rating exist. That is, if EQUIV(i)=BESTEQUIV (step 372), then the designation of BESTMATCH depends on the outcome at decision step 374.

Figure 7E:
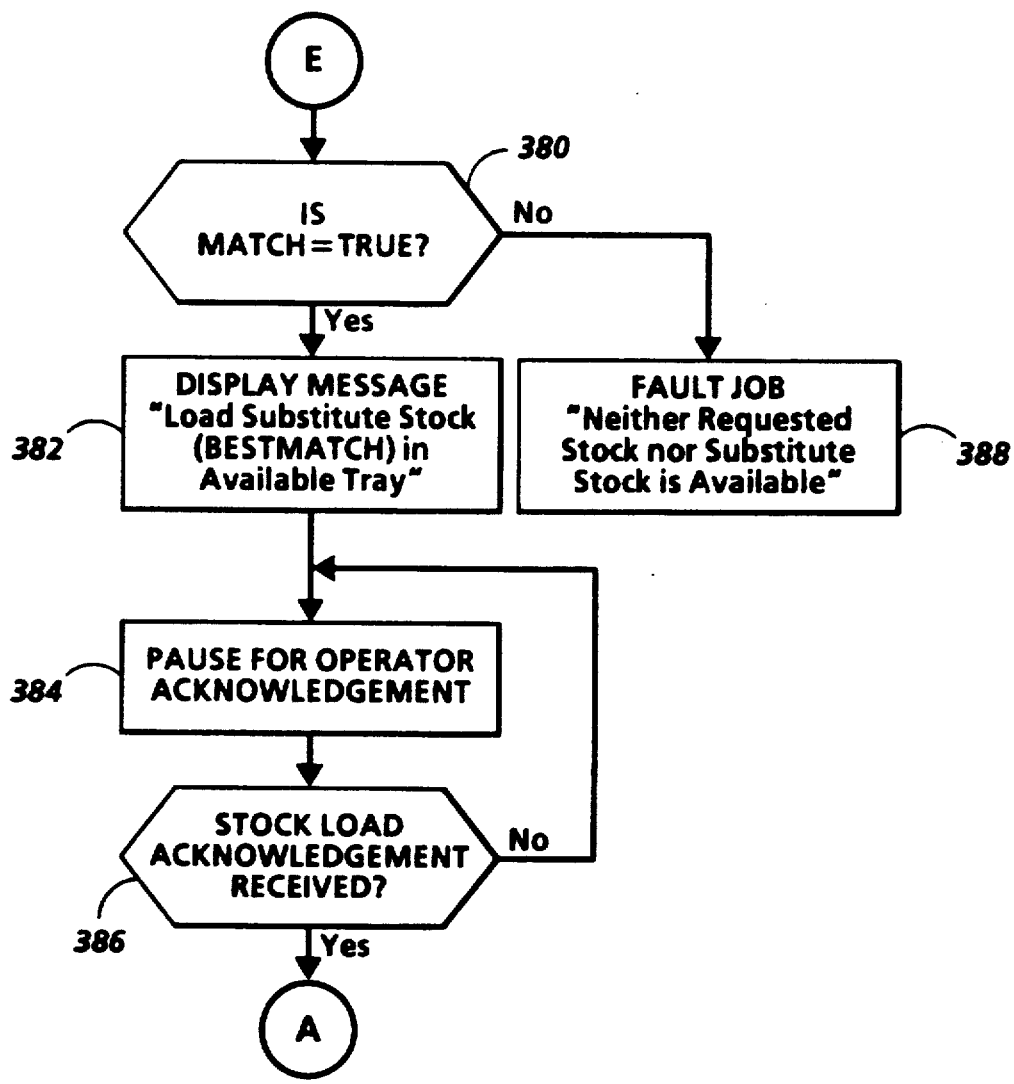

Referring to FIG. 7E, once each RECORD(i) in the Substitution Table Database has been examined, one of two approaches is taken. If a match is found between a CALLEDSTOCK(i) and a SUBSTITUTESTOCK(i)- (at step 380), then the operator is instructed (via steps 382, 384 and 386) to load the SUBSTITUTESTOCK(i) corresponding to the BESTMATCH set at step 370. If, on the other hand, no match is found, then a fault message, of the characteristic shown at step 388, is displayed.

Numerous features of the present invention will be appreciated by those skilled in the art. One feature of the disclosed technique of the present invention is that, for a job to be performed at a job site, the technique permits a suitable stock to be substituted automatically for a requested stock, which requested stock is not available at the site. Another feature of the disclosed technique of the present invention is that it saves time for a job site operator. In particular, the job site operator is not required to reprogram each job upon receiving a request for a stock characteristic that is not on site. Yet another feature of the disclosed technique of the present invention is that requested or called for stock characteristics are mapped against suitable substitutes in a look-up table so that when a request for an unavailable stock characteristic is received at the site, all of the suitable substitutes can be assessed so that a best match for the requested stock characteristic can be determined efficiently. Yet another feature of the disclosed technique of the present invention is that various equivalent stock characteristics can be mapped for each requested stock characteristic. By use of a prioritizing procedure, the most desirable equivalent for substitution can be determined readily.

What is claimed is:

1. A process for operating an electronic printing system at a job site for producing print jobs with one or more stock characteristics from image signals, the electronic printing system having a user interface for inputting printing instructions for the print jobs and a plurality of supply trays for supplying print media, comprising the steps of:
    identifying stock characteristics currently available for loading in the print media supply trays when printing the print jobs;
    identifying stock characteristics potentially selectable but not available at the site for loading in the print media supply trays;
    mapping individual ones of the unavailable stock characteristics to at least one of the available stock characteristics with the user interface;
    on input of a print job, comparing a requested stock characteristic of the print job with the stock characteristics available; and
    where the requested stock characteristic is unavailable, using the mapping step to substitute a corresponding available stock characteristic for the unavailable, requested stock characteristic.

2. A process for operating an electronic printer at a job site for printing jobs in accordance with discrete job printing programs using a user interface including a display screen, comprising the steps of:
    displaying a table of programmable stock characteristics on the screen;
    identifying in the table ones of the stock characteristics currently available for use at the job site;
    for others of the stock characteristics that are not available for use at the job site, identifying in the table at least one substitute stock characteristic from the available stock characteristics for each of the unavailable stock characteristics;
    on receipt of a job, accessing the table;
    comparing stock characteristics programmed for the job with the stock characteristics listed in the table; and
    for each of the stock characteristics programmed for the job that is unavailable at the job site, substituting the substitute stock characteristic listed in the table.

3. A process for operating an electronic printer at a job site for printing jobs in accordance with discrete job printing programs including programming information regarding stock characteristics, comprising the steps of:
    determining if a requested stock characteristic programmed for a job is available at the job site;
    where substitution of the programmed stock characteristic with an alternate stock characteristic is allowed and the requested stock characteristic is unavailable at the site, accessing a predetermined stock substitution table, the stock substitution table being generated with a user interface by mapping substitute stock characteristics against requested stock characteristics;
    from the table, identifying at least one substitute stock characteristic for the requested stock characteristic; and
    where the substitute stock characteristic is available, substituting the substitute stock characteristic in place of the requested stock characteristic programmed for the job.

4. The process of claim 3, further comprising the step of determining if substitution of alternate stock characteristic in place of the unavailable stock characteristic is allowed when at least one of the stock characteristics programmed for the job is not abailable at the job site.

5. The process of claim 3, further comprising the step of determining whether the substitute stock characteristic is available at the job site.

6. The process of claim 3, further comprising the step of identifying a second substitute stock characteristic from the table for use in place of the stock characteristic programmed for the job when the substitute stock characteristic is unavailable at the site.

7. The process of claim 3, further comprising the step of inhibiting operation of the printer and printing of the job when at least one the substitute stock characteristics is not available at the site.

8. A method of controlling paper stock substitution in an electronic printing system at a job site for producing a print job from electronic data in accordance with a job program calling for one or more selected stock characteristics, the system including an interactive user interface enabling a system user to input operating instructions to the system, comprising the steps of:
    identifying in a stock library the different stock characteristics available at the job site; and
    where a selected stock characteristic of the job program is not listed in the stock library, using a substitute stock characteristic in place of the selected stock characteristic, the substitute stock characteristic being determined from a programmable look up table mapping unavailable stock characteristics that may be programmed against acceptable substitute stock characteristics currently available in the stock library; and
    generating the programmable look up table with the user interface.

9. The method of claim 8, including the step of indicating the degree of similarity of each of the available stock characteristics to each of the unavailable stock characteristics.

10. The method as defined in claim 8, including the step of:
    for the unavailable paper stock characteristics, mapping plural available paper stock characteristics in accordance with a predetermined priority.

11. In a printing system for printing a job from electronic image signals at a job site in response to job print program instructions, comprising:
    a stock library for storing a number of stock characteristics available at the job site for use in making prints in response to the job print program instructions;
    a user interface adapted to generate a programmable look up table in which stock characteristics unavailable in said stock library are mapped to available stock characteristics listed in said stock library as substitutions therefor;

means for determining, from said programmable look up table, a stock characteristic to be substituted in place of one of the unavailable stock characteristics when one of the unavailable stock characteristics is requested in the job print program instructions.

12. The printing system of claim 11, wherein said programmable look up table provides indicia of equivalence for each mapping, the indicia indicating the degree of similarity of each available stock characteristic to each unavailable stock characteristic.

13. The printing system of claim 11, where for an unavailable stock characteristic mapped to plural available stock characteristics, means are provided for selecting a substitute stock characteristic in accordance with a predetermined priority.

* * * * *